(12) United States Patent
Akitaya et al.

(10) Patent No.: US 6,820,018 B2
(45) Date of Patent: Nov. 16, 2004

(54) POWER CONTROL CIRCUIT

(75) Inventors: Masato Akitaya, Kanagawa (JP); Yumiko Yamaguchi, Kanagawa (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 110 days.

(21) Appl. No.: 10/228,522

(22) Filed: Aug. 27, 2002

(65) Prior Publication Data

US 2003/0060990 A1 Mar. 27, 2003

(30) Foreign Application Priority Data

Aug. 27, 2001 (JP) .......................................... 2001-256922
Aug. 27, 2001 (JP) .......................................... 2001-256923

(51) Int. Cl.[7] .......................... H01H 43/00; G01R 21/00
(52) U.S. Cl. ........................... 702/60; 700/296; 700/306
(58) Field of Search .............................. 702/60–63, 79, 702/176, 177, 178; 700/22, 286, 296, 306; 713/300, 320, 321, 323, 324; 358/1.13, 1.14; 307/80, 85, 86, 140

(56) References Cited

U.S. PATENT DOCUMENTS 5,142,684 A * 8/1992 Perry et al. .................. 713/320
5,708,821 A * 1/1998 Takikita ...................... 713/310
6,098,175 A * 8/2000 Lee ............................. 713/320

* cited by examiner

Primary Examiner—Marc S. Hoff
Assistant Examiner—Manuel L. Barbee
(74) Attorney, Agent, or Firm—Patents + TMS, P.C.

(57) ABSTRACT

Disclosed is a power control circuit utilizable in an electronic device. The power control circuit includes a power on/off switch having first and second switches; a capacitive element connected to a power section via the first switch; a first switching element connected to the power section via the second switch; a microcomputer for controlling power on/off of the first switching element; and a second switching element provided between the power section and each of the microcomputer and a predetermined circuit block. The microcomputer is programmed to control the power control circuit such that, when supplying power to the microcomputer, the microcomputer holds a power-on state of the first switching element before the first switching element is turned off because of the discharge of the electric charge, and then, when the microcomputer detects that the predetermined circuit block has not operated for a given period of time, the microcomputer turns off the first switching element.

23 Claims, 11 Drawing Sheets

POWER CONTROL CIRCUIT

BACKGROUND OF THE INVENTION

1. Field of the Invention

The present invention relates to a power control circuit for controlling on/off of a power source to an electronic device.

2. Description of the Prior Art

Conventionally, to turn on/off an electronic device, as shown in FIG. 11, a power on/off switch SW1 is provided between a battery BATT1 and a circuit block 54 to directly turn power supply on/off. If an automatic power-off function is required, as shown in FIG. 12, a power device Q1 such as a power MOS and a power transistor is provided between a battery BATT2 and a circuit block 54, and the power device Q1 is turned on or off in response to on or off of a power on/off switch SW2.

When such a power device is used in an electronic device, the power device must be controlled by monitoring a state of a power on/off switch in the electronic device continuously using a microcomputer, for example. In this case, supply of electrical power to a circuit block of the electronic device can be cut off. However, since the microcomputer must monitor the state of the power on/off switch continuously, electrical power is continuously supplied to the microcomputer to maintain the function of the microcomputer. In practice, the microcomputer monitors the state of the power on/off switch by using a power saving mode such as a sleep mode.

In the case of an example as shown in FIG. 12, the electric power supplies to the microcomputer 56 continuously, so the microcomputer 56 monitors a power on/off state of a power on/off switch SW2 via a SW monitoring port continuously.

Here, if the power on/off switch SW2 is turned off, the level of the SW monitoring port becomes low since the SW monitoring port is connected to ground via a resistive element R1. When the microcomputer 56 detects that the level of the SW monitoring port is low, the microcomputer 56 sets a circuit power-supply control port to a high level. Thus, a power device Q1 is turned off, thereby stopping the power supply to a circuit block 54. Namely, a power of the electronic device is turned off.

On the other hand, if the power on/off switch SW2 is turned on, the level of the SW monitoring port becomes high. When the microcomputer 56 detects that the SW monitoring port is a high level, the microcomputer 56 sets the circuit power-supply control port to a low level. Thus, the power device Q1 is turned on, thereby supplying power to the circuit block 54. Namely, a power of the electronic device is turned on.

When the automatic power-off function mentioned above is provided in the electronic device, the electronic device must be constructed to be able to turn on and off of the electronic device by using a controller such as the microcomputer 56.

However, in this configuration, if the power to the microcomputer 56 is turned off, the microcomputer 56 will not be able to turn on the power to the power device Q1, i.e., the power to the electronic device. Therefore, even if the power supply to the circuit block 54 is stopped, the electrical power must be supplied to the microcomputer 56 continuously.

Therefore, if the electronic device is equipped with an automatic power-off function, the controller such as the microcomputer 56 necessarily consumes the electric power. In particular, if the electronic device is battery-operated, there is a disadvantage to shorten an operating time of the electronic device because of power consumption by the controller.

Further, in the conventional electronic device as shown in FIG. 12, two ports, i.e., the SW monitoring port and the circuit power-supply control port, and the microcomputer 56 are need. In addition, as mentioned above, the microcomputer 56 needs a program for controlling a shift to a sleep mode after automatic power off as well as a program for monitoring the state of the power on/off switch SW2 and controlling on and off of the power device Q1 in response to an interrupt process. Therefore, the program for the microcomputer 56 becomes complicated, thus leading to the case that the incidence of bug in the program is increased.

SUMMARY OF THE INVENTION

In view of the stated problem of the conventional art, it is therefore an object of the present invention to provide a power control circuit having an automatic power-off function capable of reducing electrical power consumption if the power is turned off, of reducing the number of ports of a microcomputer, and of simplifying program of the microcomputer.

In accordance with one aspect of the present invention, in order to achieve the above object, the present invention is directed to a power control circuit that controls on/off of power of an electronic device including a power section and a predetermined circuit block. The power control circuit of the present invention comprises: a power on/off switch having a first switch and a second switch, the first and second switches adapted to be turned on or off simultaneously; a capacitive element connected to the power section via the first switch, said capacitive element adapted to be charged by the power section via the first switch when said power on/off switch is turned off and to be discharged when said power on/off switch is turned on; a first switching element connected to the power section via the second switch, said first switching element adapted to be turned off when said power on/off switch is turned off, and to be in a power-on state while an electric charge that has been charged in said capacitive element is being discharged when said power on/off switch is turned on; a microcomputer for controlling power on/off of said first switching element; and a second switching element provided between the power section and each of said microcomputer and the predetermined circuit block, said second switching element adapted to be turned off to stop power supply to said microcomputer and the predetermined circuit block when said first switching element is turned off, and to be turned on to supply power to said microcomputer and the predetermined circuit block when said first switching element is turned on. In this case, the microcomputer is programmed to control the power control circuit such that, when supplying power to said microcomputer, said microcomputer holds the power-on state of said first switching element before said first switching element is turned off because of the discharge of the electric charge charged in said capacitive element, and then, when said microcomputer detects that the predetermined circuit block has not operated for a given period of time, said microcomputer turns off said first switching element.

In one preferred embodiment of this invention, it is preferred that the power section includes one or more battery. It is also preferred that the first and second switching elements are transistors.

In this embodiment of the present invention, the power control circuit may further comprise a regulator provided between said second switching element and the predetermined circuit block for stabilizing a power-supply voltage supplied from the power section.

Further, in this embodiment of the present invention, the electronic device may be selected from a printer, a notebook type personal computer, a personal data assistant machine, a handy type game machine, and a battery-operated radio and audio equipment.

If the electronic device is a printer, the printer may be a Cycolor type printer. Also, the printer may comprise a head for exposure on which one or more light sources for emitting red light, one or more light sources for emitting green light, and one or more light sources for emitting blue light are provided. In this case, the printer is constructed to reproduce an image on a photosensitive printing paper by exposing the photosensitive printing paper by means of said head for exposure. Here, the photosensitive printing paper may contain a plurality of photosensitive microcapsules to be exposed by said head for exposure.

Moreover, the printer may further comprise: a first group of registers for setting image data corresponding to the light sources for emitting red light, image data corresponding to the light sources for emitting green light, and image data corresponding to the light sources for emitting blue light; and a second group of registers for holding the image data, which has been set in each of said first group of registers. In this case, the printer is constructed so as to set next image data in said first group of registers and to drive each of the light sources provided on the head for exposure by using the image data that is held in each of said second group of registers in parallel.

In view of the stated problem of the conventional art, it is therefore another object of the present invention to provide a power control circuit having an automatic power-off function capable of reducing electrical power consumption if the power is turned off, and of having a simple structure without a microcomputer.

In another aspect of the present invention, in order to achieve the above object, the present invention is directed to a power control circuit that controls on/off of power of an electronic device including a power section and a predetermined circuit block. The power control circuit of the present invention comprises: a power on/off switch having a first switch and a second switch, the first and second switches adapted to be turned on or off simultaneously; a capacitive element connected to the power section via the first switch, said capacitive element adapted to be charged by the power section via the first switch when said power on/off switch is turned off and to be discharged when said power on/off switch is turned on; a first switching element connected to the power section via the second switch, said first switching element adapted to be turned off when said power on/off switch is turned off, and to be in a power-on state while an electric charge that has been charged in said capacitive element is being discharged when said power on/off switch is turned on; a hard circuit for controlling power on/off of said first switching element; and a second switching element provided between the power section and each of said hard circuit and the predetermined circuit block, the second switching element adapted to be turned off to stop power supply to said hard circuit and the predetermined circuit block when said first switching element is turned off, and to be turned on to supply power to said hard circuit and the predetermined circuit block when said first switching element is turned on. In this case, the power control circuit is constructed such that, when supplying power to said hard circuit, said hard circuit holds the power-on state of said first switching element before said first switching element is turned off because of the discharge of the electric charge charged in said capacitive element, and then, when said hard circuit detects that the predetermined circuit block has not operated for a given period of time by measuring the given period of time based on an output signal of the predetermined circuit block, said hard circuit turns off said first switching element.

In one preferred embodiment of this invention, it is preferred that the hard circuit is a timer circuit. It is also preferred that the power section includes one or more battery, and that the first and second switching elements are transistors.

In this embodiment of the present invention, the power control circuit may further comprise a regulator provided between said second switching element and the predetermined circuit block for stabilizing a power-supply voltage supplied from the power section.

Further, in this embodiment of the present invention, the electronic device may be selected from a printer, a notebook type personal computer, a personal data assistant machine, a handy type game machine, and a battery-operated radio and audio equipment.

If the electronic device is a printer, the printer may be a Cycolor type printer. Also, the printer may comprise a head for exposure on which one or more light sources for emitting red light, one or more light sources for emitting green light, and one or more light sources for emitting blue light are provided. In this case, the printer is constructed to reproduce an image on a photosensitive printing paper by exposing the photosensitive printing paper by means of said head for exposure. Here, the photosensitive printing paper may contain a plurality of photosensitive microcapsules to be exposed by said head for exposure.

Moreover, the printer may further comprise: a first group of registers for setting image data corresponding to the light sources for emitting red light, image data corresponding to the light sources for emitting green light, and image data corresponding to the light sources for emitting blue light; and a second group of registers for holding the image data, which has been set in each of said first group of registers. In this case, the printer is constructed so as to set next image data in said first group of registers and to drive each of the light sources provided on the head for exposure by using the image data that is held in each of said second group of registers in parallel.

In yet another aspect of the present invention, in order to achieve the above object, the present invention is directed to a power control circuit that controls on/off of power of an electronic device including a power section, a power on/off switch and a predetermined circuit block. The power control circuit of the present invention comprises: a capacitive element connected to the power section, said capacitive element adapted to turn on a first switching element when the power on/off switch is turned on; a second switching element connected to the power section, said second switching element adapted to be turned on to supply power to the predetermined circuit block while the first switching element is turned on; and means for holding a power-on state of the first switching element when said holding means is supplied electric power from the power section via said second switching element.

In yet one more aspect of the present invention, in order to achieve the above object, the present invention is directed to a power control circuit that controls on/off of power of an electronic device including a power section and a predetermined circuit block driven by power from the power section. The power control circuit of the present invention comprises: a power on/off switch for turning on and off the power section; a capacitive element connected to said power on/off switch so that it is charged by the power section when said power on/off switch is turned off and discharged when said power on/off switch is turned on; a first switching element adapted to be turned on by an electric charge charged in said capacitive element when the power on/off switch is turned on and to be in a power-on state while the electric charge that has been charged in said capacitive element is being discharged when said power on/off switch is turned on; a second switching element provided between the power section and the predetermined circuit block for supplying electrical power from the power section to the predetermined circuit block, said second switching element adapted to be turned on and off in response to on and off of the first switching element; and means for holding the power-on state of said first switching element before said first switching element is turned off due to the discharge of the electric charge charged in the capacitive element, said holding means adapted to receive power from the power section when said second switching element is turned on by said first switching element.

In one preferred embodiment of this invention, the holding means is adapted to turn off said first switching element when it is detected that the predetermined circuit block is not being operated within a predetermined period of time.

In this embodiment of the present invention, it is preferred that the power on/off switch includes a first switch connected to the capacitive element for turning on said first switching element and a second switch provided between said first switching element and said second switching element, said first and second switches adapted to be turned on and off simultaneously.

These and other objects, structures and advantages of the present invention will be apparent from the following description of the preferred embodiment when it is considered taken in conjunction with the appended drawings.

DETAILED DESCRIPTION OF THE PREFERRED EMBODIMENTS

With reference to the appended drawings, a detailed description of the preferred embodiment of a power control circuit and an electronic device according to the present invention will be given below.

Figure 1:
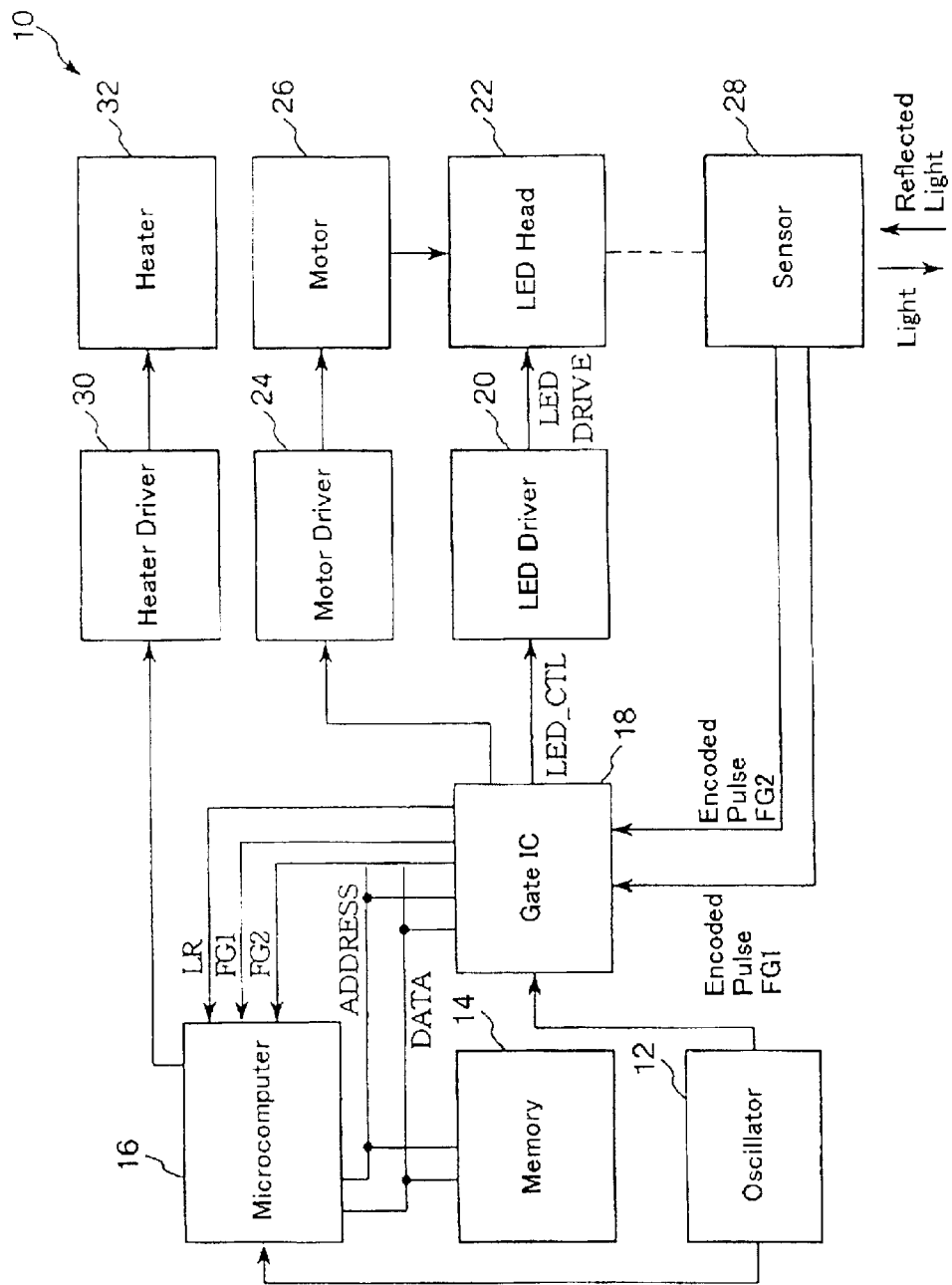
FIG. 1 is a block diagram illustrating an embodiment in which a power control circuit according to the present invention is applied to a printer.

FIG. 1 is a block diagram illustrating an embodiment in which a power control circuit according to the present invention is applied to a printer.

The printer 10 shown in FIG. 1 reproduces (prints out) an image corresponding to image data received from an image data source, which supplies the image data. As shown in FIG. 1, the printer 10 comprises, an oscillator 12; a memory 14; a microcomputer 16; a gate IC (digital IC) 18; an LED driver 20; an LED head 22 (optical head for exposing), which is a head for the printer; a motor driver 24 and a motor 26; a linear encoder (not shown) having a linear scale and a linear sensor 28; and a heater driver 30 and a heater 32.

Here, the image data is supplied by a digital device such as a personal computer (PC), or a digital camera, which can handle image data as digital data; or supplied by an analog device such as a video player (VCR), or a television set (TV), which can handle image data as video signals, compatible with systems such as NTSC and PAL.

The printer 10 is connected to a digital device such as a PC via a parallel port. The digital data transmitted by the digital device via serial communication or the like is received by the printer 10 as image data. Also, the printer 10 is connected to an analog device such as a VCR via a video terminal. The video signals transmitted by the analog device are received by the printer 10 as image data.

In addition, as mentioned above, the image data source may be either a digital or analog device. Any device that can transmit image data to the printer 10 can be utilized as an image data source. Similarly, a system for connecting the printer 10 to the image data source is not limited to any one interface; and thus image data formats can be transmitted using any well-known communication protocol and interface standard.

Further, in the printer 10 various types of photosensitive printing paper can be used; such as printing paper coated with photosensitive microcapsules (cyliths) (Cycolor® medium, Cycolor type printing paper), and Polaroid® film, both of which are known.

Still further, (not shown in FIG. 1) the printer 10 is provided with power supply circuits (hereinafter described in detail) for supplying power at a given voltage to various sections as mentioned above; a circuit for interfacing between the printer 10 and the image data source; a video decoder for decoding the video signals, and converting image data to digital data; a pick-up mechanism (initial feed mechanism); and a mechanism for feeding a printing paper.

In the present embodiment, the printer 10 is the Cycolor type printer, which reproduces an image on a printing paper coated with many photosensitive microcapsules (Cycolor mediums). In the printer 10 a pressure mechanism 222 is provided for mechanically pressurizing an exposed printing paper to develop an image (developing process) (see FIG. 3). The pressure mechanism 222 may be either spherical or cylindrical in form.

Hereinafter, each of the elements of the printer 10 will be described in turn.

As shown in FIG. 1, in the printer 10 the oscillator 12 generates clock signals having a predetermined frequency. These clock signals are supplied to elements of the printer 10 via the microcomputer 16 and the gate IC 18, whereby such elements are caused to operate synchronously.

The memory 14 is a buffer for storing the image data transmitted from the image data source. The memory 14 comprises any known semiconductor memory. Examples of which include various types of RAM (Random Access Memory) such as an SRAM (Static RAM), and a DRAM (Dynamic RAM); and nonvolatile memories such as an EPROM, an EEPROM; and also a flash memory.

The microcomputer 16 detects coordinate positions of a plurality of LEDs mounted on the LED head 22, and functions to control communication of image data from the image data source; the heater driver 30; LED current (light intensity of an LED); the mechanical elements, such as the pick-up mechanism of a printing paper and the mechanism for feeding a printing paper. Further, the microcomputer 16 is able to detect operation errors that may occur.

The gate IC 18 functions to control the LED driver 20; the motor 26 via the motor driver 24; and the memory 14.

The microcomputer 16, the memory 14, and the gate IC 18 are connected to each other via an address bus "ADDRESS" and a data bus "DATA". The image data stored in the memory 14 can be accessed by both the microcomputer 16 and the gate IC 18 via the address bus "ADDRESS" and the data bus "DATA".

The supplied image data is transmitted from microcomputer 16 to the memory 14 via the data bus "DATA," and is written (stored) in a given address specified in the memory 14.

During printing of an image onto a printing paper, the microcomputer 16 reads out the image data stored in the memory 14, after which the image data read out is transmitted with the address data corresponding to the image data to the gate IC 18.

A control means for controlling the driving of the printer 10 includes the microcomputer 16 and the gate IC 18.

While in the preceding description of the present embodiment, a variety of functions are shared by the microcomputer 16 and the gate IC 18, and various modification of such sharing of functions is possible, as required.

The LED head 22 is able to expose a printing paper, and is provided with one or more LED(s) (R-LED) emitting red light; one or more LED(s) (G-LED) emitting green light; and one or more LED(s) (B-LED) emitting blue light. The gate IC 18 controls the driving (for example, the emission timing) of these LEDs at the LED head 22 via the LED driver 20.

In the present invention, the LED head 22 may be provided with only one LED corresponding to each color (red, green and blue), i.e., R-LED, G-LED and B-LED; or, alternatively, it may be provided with a plurality of LEDs, each corresponding to any one or two such colors; or may be provided with a plurality of LEDs, each of which may correspond to any one such color. By enabling a plurality of LEDs to correspond to any one color, it is possible to increase a printing speed, and thereby enable printing of a high-resolution image, even in a case that adequate light is lacking. It is also to be noted that in the present embodiment, the LED head 22 is provided with three LEDs, corresponding to any one color (see FIG. 3).

In the present embodiment, the head for a printer (printer head) is not limited to the LED head 22 (i.e., the light source is not limited to LED), and any printer head known in the art (for exposure), that is capable of utilizing a light source of a predetermined wavelength for exposure of a photosensitive printing paper.

It should be noted here that a printer head for use in the present embodiment is not limited to that described above for exposure.

The motor 26 is driven by the motor driver 24 under control of the gate IC 18. During a printing operation, the motor 26 is driven to pick up one by one sheets of printing paper from a storage section by means of the pick-up mechanism (not shown), which mechanism has an initial predetermined setting. The LED head 22 is caused to reciprocate (move) at a given constant speed in a main scanning direction by means of a head moving mechanism, for example, a gear mechanism (not shown). During this operation, the printing paper is fed by a printing paper feeding mechanism (not shown) in a sub scanning direction substantially perpendicular to the main scanning direction. At this stage, the printing paper is exposed by the LED head 22, and a latent image corresponding to the image data is recorded (formed) on the printing paper.

The linear scale and the sensor 28 are utilized to detect a position (coordinate position) of the LED head 22 in the main and sub scanning directions with respect to a printing paper, i.e., to detect each dot (pixel) during a reciprocating motion of the LED head 22, and to detect a direction of movement of the LED head 22 with respect to the printing paper.

The linear scale is utilized in an encoder provided with a plurality of monochrome patterns in bar form. The linear scale is placed at a predetermined position spaced apart from the LED head 22, in such a way that the LED head 22 can be moved along in the main scanning direction relative to the linear scale. The patterns of the linear scale maintain a predetermined constant interval (a predetermined pitch) along the moving direction of the LED head 22 (i.e., along the main scanning direction). Here, in the present embodiment, the pitch of the patterns corresponds to the pitch of the pixel of an image.

On the other hand, the sensor 28 has an emitting section for emitting light toward the linear scale and a plurality of receiving sections for receiving reflected light, which is emitted from the emitting section and reflected from the linear scale. The received light then undergoes photoelectric-transferring.

Here, an LED (light emitting diode) can be used as the emitting section, and a photodiode or a phototransistor can be used as the receiving section.

In the present embodiment, the LED head 22 and the sensor 28 are integrated on a carriage (not shown). As the carriage (i.e., the LED head 22) is moved, the sensor 28 outputs two encoded pulses FG1 and FG2, which have phases that shift by 90 degrees to each other respectively, as shown in a timing chart in FIG. 2. Both the encoded pulses FG1 and FG2 are supplied to the gate IC 18.

One cycle of the encoded pulse FG1 or FG2, which is the combined period of the duration of a high level (H) and the duration of a low level (L), corresponds to the time required for scanning (or moving over) two dots of an image (i.e., twice the pitch existing between two adjacent dots) in the main scanning direction.

When the LED head 22 moves in a certain direction, the phase of the encoded pulse FG1 lags 90 degrees behind the phase of the encoded pulse FG2; when the LED head 22 moves in a corresponding reverse direction, the phase of the encoded pulse FG1 precedes by 90 degrees the phase of the encoded pulse FG2.

Figure 2:
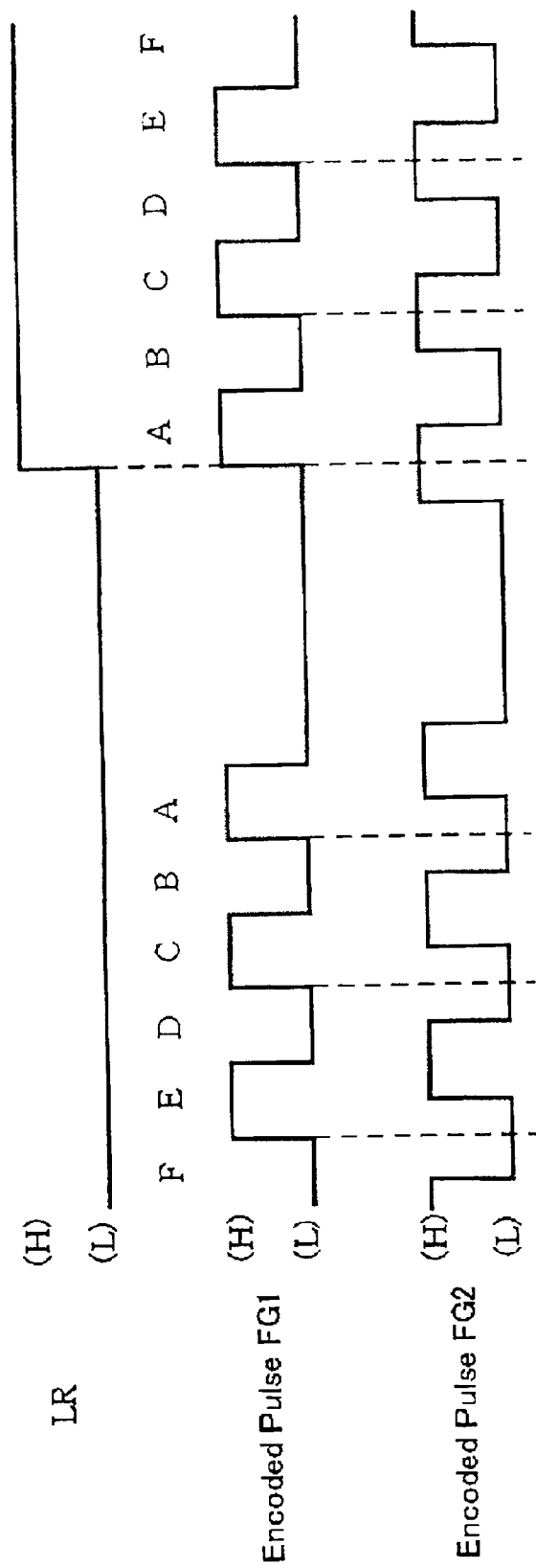
FIG. 2 is a timing chart illustrating a timing-relation between two encoded pulses FG1 and FG2 and an LR signal in the printer shown in FIG. 1.

As shown in the timing chart in FIG. 2, the gate IC 18 latches a level of the encoded pulse FG2 at a rising edge of the encoded pulse FG1 input by the sensor 28, and then outputs an LR signal to the microcomputer 16.

One cycle of the LR signal, which is the combined period of the duration of a high level and the duration of a low level, corresponds to the time required for scanning (feeding) dots corresponding to two lines of an image (i.e., twice the pitch existing between two adjacent dots) in the sub scanning direction.

Figure 3:
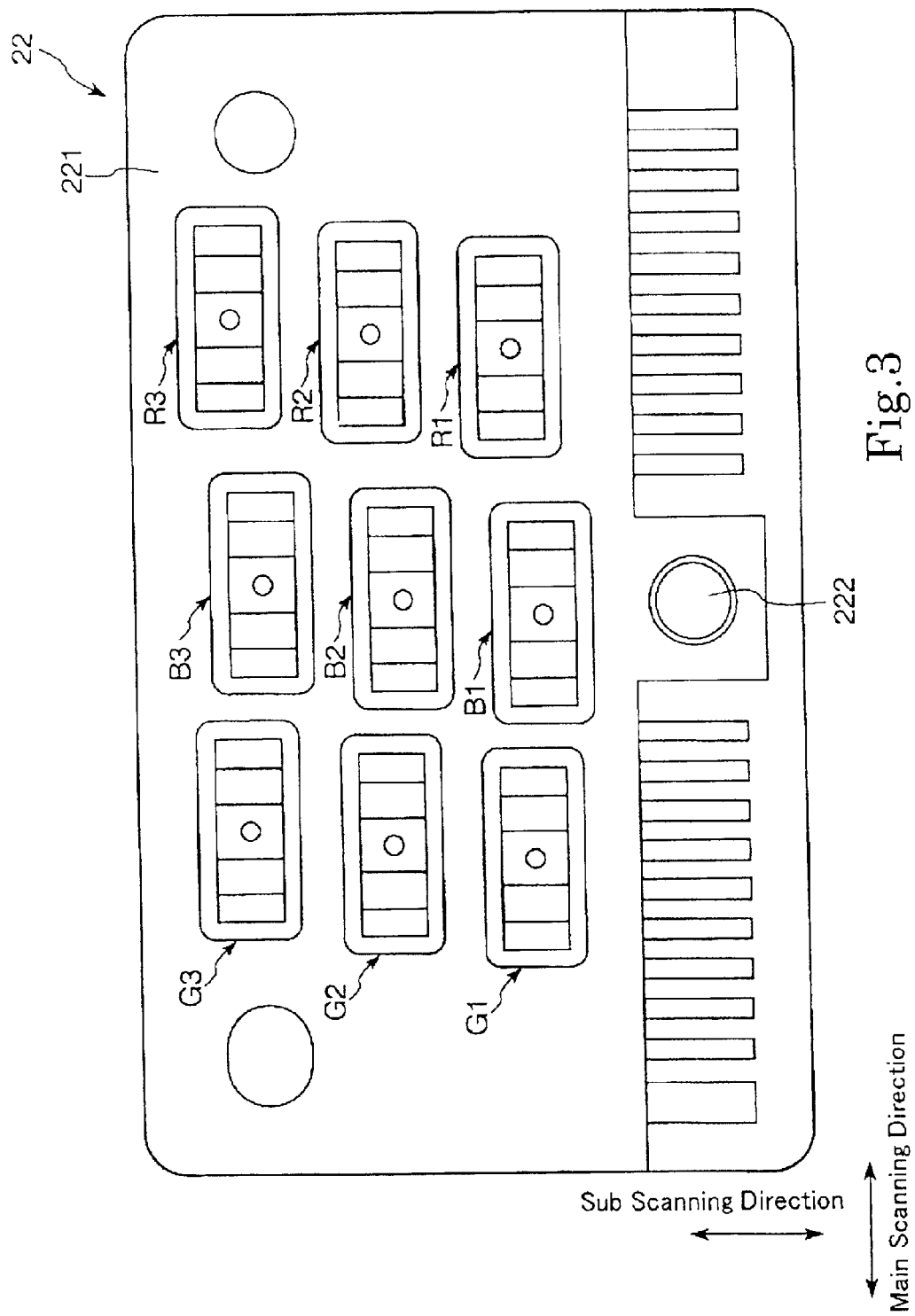
FIG. 3 is a bottom plan view illustrating one example of a structure of an LED head in the printer shown in FIG. 1.

The direction of movement of the LED head 22 is detectable (distinguished) by using the LR signal. Namely, when a level of the LR signal is low, movement of the LED head 22 is determined to be in a certain direction (for example, to the right of the LED head 22, as shown in FIG. 3). Conversely, when a level of the LR signal is high, movement in a reverse direction is determined (for example, to the left of the LED head 22).

When movement of the LED 22 is reversed during a turnback period, the levels of both the encoded pulses FG1 and FG2 in FIG. 2 remain low for a while. Namely, the direction of movement of the LED head 22 is switched (reversed) in the turnback period.

The LR signal and the encoded pulses FG1 and FG2 mentioned above are supplied to the microcomputer 16.

The microcomputer 16 detects a direction in which the LED head 22 and moves, and also a position (coordinate position) of both main and sub scanning directions of the LED head 22 (i.e. an area of the LED head 22) based on the LR signal and the encoded pulses FG1 and FG2. In fact, the microcomputer 16 detects a direction in which the LED head 22 is moving, on the basis of the LR signal and the encoded pulse FG2. Further, the microcomputer 16 sequentially detects (calculates) the coordinate positions of the plurality of LEDs mounted on the LED head 22 in the main and sub scanning directions by counting the number of pulses of the encoded pulse FG1 and the LR signal.

The microcomputer 16 also sequentially reads out from the memory 14 image data corresponding to the calculated coordinate positions of the plurality of LEDs, and supplies the image data and the address data indicating the LED corresponding to the image data to the gate IC 18 to thereby set the image data in a first group of registers, as mentioned hereinafter.

While in the present embodiment, the printer 10 is configured such that the microcomputer 16 calculates the coordinate positions of the plurality of LEDs, so as to manage image data, it will be apparent to those skilled in the art that the present invention is in no way limited thereto. For example, the printer 10 of the present invention may include a computing device for calculating the coordinate positions and setting the image data in a first group of registers.

In contrast to microcomputer 16, which uses sequential processing, such a computing device may use parallel processing to simultaneously calculate at high speed all coordinate positions of the plurality of LEDs. Consequently, the microcomputer 16 is not required to have a high processing speed, and therefore inexpensive microcomputers having a relatively low processing speed can be utilized, thereby reducing the cost of the printer 10. A further advantage of a printer having such a computing device is provided in that the LED head 22 can be moved more quickly, and the number of LEDs mounted on the LED head 22 can be increased, thereby enabling printing to be carried out in a relatively short period of time, at a relatively higher resolution.

Such a computing device may be provided either separately from or integral to the gate IC 18.

In the printer 10 shown in FIG. 1, following exposure and development of ink, the heater 32 is used to heat a sheet of printing paper to harden ink (image). The microcomputer 16 controls, via the heater driver 30, the operations of the heater 32 (e.g., timing of heating).

Next, a structure of the LED head 22 in the printer 10 will be described. FIG. 3 is a bottom plan view illustrating an example of a structure of the LED head.

As shown in FIG. 3, in the present embodiment the LED head 22 comprises a head base 221, on which a total of nine LEDs (R1–R3, G1–G3, and B1–B3) are provided. The nine LEDs include three LEDs R1–R3 for emitting red light, three LEDs G1–G3 for emitting green light, and three LEDs B1–B3 for emitting blue light.

As shown in FIG. 3, the nine LEDs are provided in a form of a 3×3 matrix (tri-diagonal matrix), and are arranged so as to offset each other by a predetermined number of dots in both main and sub scanning directions.

Namely, the LEDs R3, B3, and G3 of FIG. 3 are arranged in a top row of the matrix so as to be offset respectively by a predetermined number of dots in a vertical direction (sub scanning direction). In a case that the structure shown in FIG. 3 has the LED G3 in a central vertical position relative to the top row of the matrix, the LED R3 is placed at a position above the LED G3, corresponding to by a predetermined number of dots; and the LED B3 is placed at a position below the LED G3, corresponding to by a predetermined number of dots.

Further, LEDs R2, B2, and G2 are arranged in the middle row of the matrix so that they are offset respectively by a predetermined number of dots in the vertical direction as shown in FIG. 3, in the same manner as is utilized for the top row. Moreover, LEDs R1, B1, and G1 are arranged in the bottom row of the matrix so that they are offset in this order by a predetermined number of dots in the vertical direction as shown in FIG. 3, in the same manner as is utilized for the top and middle rows.

Further, the LEDs R3, R2, and R1 are arranged in the right column of the matrix so that they are offset in this order by a predetermined number of dots in the left-right direction (the main scanning direction) seen in FIG. 3. With regard to the structure shown in FIG. 3, the LED R2 is placed at the center of the horizontal direction in the right column of the matrix, the LED R1 is placed to the left of the LED R2 by a predetermined number of dots, and the LED R3 is placed to the right of the LED R2 by a predetermined number of dots.

Moreover, the LEDs B3, B2, and B1 are arranged in the middle column of the matrix so that they are offset in this order by a predetermined number of dots in the left-right direction as shown in FIG. 3, in the same manner as the right column. Similarly, the LEDs G3, G2, and G1 are arranged in the left column of the matrix so that they are offset in the above-mentioned order by a predetermined number of dots in the left-right direction as shown in FIG. 3 in the same manner as the middle and right columns.

As mentioned above, the printer 10 of the present embodiment causes the LED head 22 to move in the main scanning direction, and causes the printing paper to move in the sub scanning direction. In this case, a latent image is recorded on a photosensitive printing paper by sequentially emitting lights with colors corresponding to an image data to, the photosensitive printing paper by means of the nine LEDs R1–R3, G1–G3, and B1–B3 mounted on the LED head 22 and thereby two-dimensionally exposing the printing paper.

In other words, a latent image corresponding to an image data is recorded on each dot of the printing paper by sequentially emitting a light from each of the LEDs R1–R3, G1–G3, and B1–B3 mounted on the LED head 22. In this regard, it is to be noted that the image data that is set in each of the three LEDs R1–R3 is identical for each dot (the same image data is set in each of the three LEDs R1–R3). Similarly, for each dot, the image data that is set in each of the three LEDs G1–G3 is identical, and the image data that is set in each of the three LEDs B1–B3 is identical.

Here, since each of the LEDs is offset in the sub scanning direction to each other in the LED head 22 shown in FIG. 3, there is a time interval corresponding to more than a predetermined number of lines between the exposure of red light by means of the LED R3 and the exposure of green light by means of the LED G3. Also, there is a time interval corresponding to more than a predetermined number of lines between the exposure of green light by means of the LED G3 and the exposure of blue light by means of the LED B3.

In a printing paper coated with photosensitive microcapsules, there is a characteristic that the sensibility of the microcapsule can be increased by emitting light at regular intervals rather than emitting light continuously. Therefore, there is an advantage that the sensibility of the printing paper can be enhanced by offsetting the positions of each LED in the sub scanning direction as in the LED head 22 shown in FIG. 3.

In this regard, it is to be noted that the arrangement of each LED (e.g., its spacing or its shift length) is not limited thereto, and the arrangement may be modified if necessary.

Further, the pressure mechanism 222 is on the head base 221 for mechanically pressurizing the exposed printing paper to develop the image (developing process). The pressure mechanism 222 is placed at a lower position to that of the head base 221, shown in FIG. 3.

Figure 4:
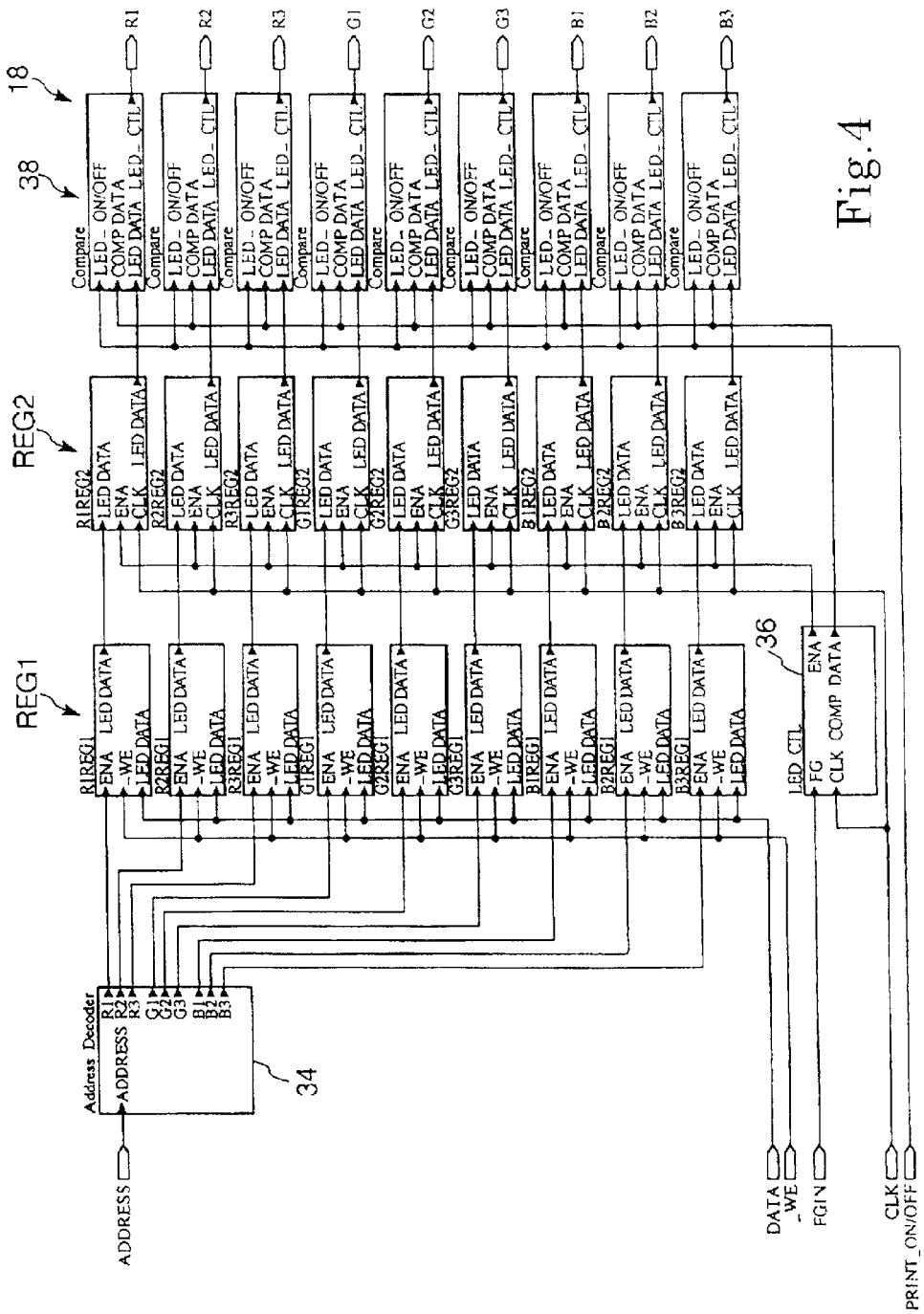
FIG. 4 is a block diagram illustrating an example of the structure of one principal part of gate IC in the printer shown in FIG. 1.

Next, an internal structure of the gate IC 18 in the printer 10 will be described. FIG. 4 is a block diagram illustrating an example of the structure of a principal part of the gate IC 18 in the printer 10 shown in FIG. 1.

The parts, which control the LED driver 20 within the gate IC 18, are shown in FIG. 4. As shown in FIG. 4, the gate IC 18 comprises an address decoder 34; an LED control circuit 36; a first group of registers REG1; a second group of registers REG2; and a group of comparators 38. In addition, components of the gate IC 18 other than those described above are omitted to simplify the following explanation.

The microcomputer 16 inputs image data "LED DATA" to the first group of registers REG1 via a data bus "DATA." The microcomputer 16 also inputs the address signal that specifies the LED (i.e., a first register) corresponding to the image data "LED DATA" to the address decoder 34 via an address bus "ADDRESS."

The address decoder 34 decodes the address signal input by the microcomputer 16 via the address bus "ADDRESS," and outputs an enable signal "ENA" to designate (select) a first register corresponding to the address signal in the first group of registers REG1.

The register designated by the "ENA" fetches and latches "LED DATA" output at this stage to the data bus "DATA".

The LED control circuit 36 generates the enable signal "ENA" and comparative data "COMP DATA" based on either the encoded pulse FG1 or FG2, which are input by the sensor 28 (hereinafter, collectively referred to as an encoded pulse "FG"), and outputs them to the second group of registers REG2 and the group of comparators 38, respectively.

The enable signal "ENA" output from the LED control circuit 36 is a timing signal used to hold the image data "LED DATA" that is set in the first group of registers REG1, and then transferred from the first group of registers REG1 to the second group of registers REG2 in parallel. The "ENA" is output at a predetermined timing after exposure of nine dots at a position an immediately preceding dot is completed.

Further, the comparative data "COMP DATA" is utilized to determine timings when the nine LEDs R1–R3, G1–G3, and B1–B3 are cased to emit light, by comparing the comparative data "COMP DATA" with the image data "LED DATA," which data is held in the second group of registers REG2. The comparative data "COMP DATA" is generated by counting a clock signal "CLK," and is output to the group of comparators 38 in synchronization with the encoded pulse "FG."For example, as shown in the timing chart in FIG. 5, an n-bit counter is used to generate the comparative data "COMP DATA." The counter is synchronized with the encoded pulse "FG" and repeats to count down from $(2^n)-1$ to 0, and then up from 0 to $(2^n)-1$. This down/up operation of the counter is expressed in the timing chart in FIG. 5 by a triangular-type waveform. It is to be noted that while in the present embodiment a value of n is equal to eight, such a value is not limited to eight.

In addition, as mentioned above, since one cycle of the encoded pulse "FG" corresponds to a time required for moving over two dots of an image in the main scanning direction, the above-mentioned operation of the counter is carried out for both the duration when the level of the encoded pulse "FG" is high and the duration when the level of the encoded pulse "FG" is low.

The first group of registers REG1 and the second group of registers REG2 includes a number of registers equal to that of a number of LEDs mounted on the LED head 22. Likewise, the group of comparators 38 includes a number of comparators equal to that of a number of LEDs mounted on the LED head 22. In the present embodiment, since a total of nine LEDs are mounted on the LED head 22, the first group of registers REG1 includes nine first registers, and the second group of registers REG2 includes nine second registers. Also, the group of comparators 38 includes nine comparators "Compare."

The first group of registers REG1 is used to set the image data "LED DATA" corresponding to each of the LEDs R1–R3, G1–G3, and B1–B3 that are mounted on the LED head 22. The image data "LED DATA" is sent from the microcomputer 16 to the gate IC 18 via the data bus "DATA."

As mentioned above, the first group of registers REG1 includes nine first registers; while in FIG. 4, the group includes: the first registers R1REG1, R2REG1, and R3REG1 to hold the image data "LED DATA" corresponding to three LEDs for red light R1, R2, and R3; the first registers G1REG1, G2REG1, and G3REG1 to hold the image data "LED DATA" corresponding to three LEDs for green light G1, G2, and G3; and the first registers B1REG1, B2REG1, and B3REG1 to hold the image data "LED DATA" corresponding to three LEDs for blue light B1, B2, and B3.

Figure 6:
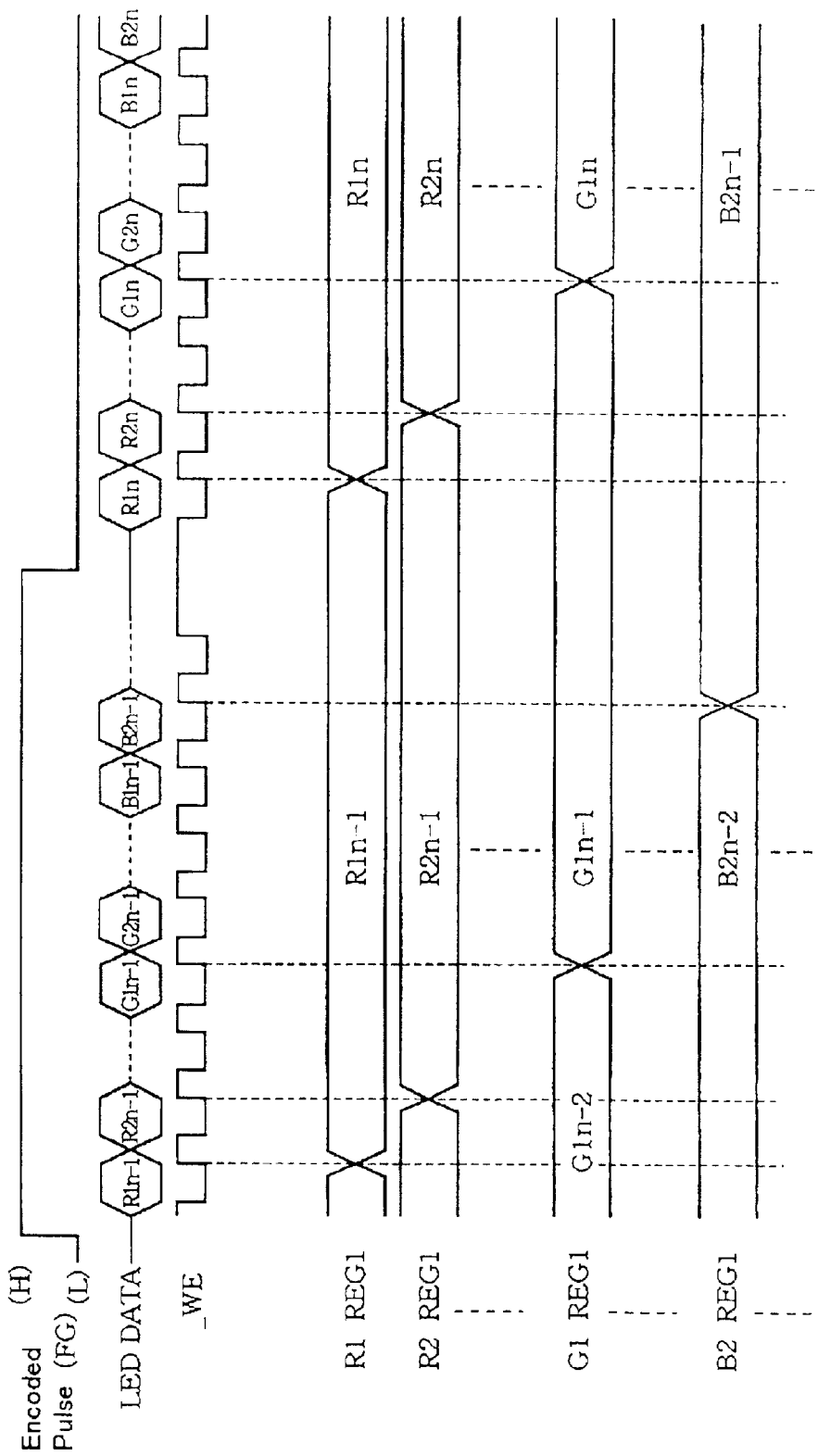
FIG. 6 is a timing chart illustrating a timing-operation of setting image data to a first group of registers in the printer shown in FIG. 1.

In the first group of registers REG1, as shown in the timing chart in FIG. 6, the image data "LED DATA" corresponding to nine LEDs R1–R3, G1–G3, and B1–B3 is sequentially set in the first register selected by the enable signal "ENA" in synchronization with both the encoded pulse "FG" and the rising edge of a write enable signal "_WE," which is input by the microcomputer 16.

In this way, image data "LED DATA" corresponding to a total of nine LEDs R1–R3, G1–G3, and B1–B3 mounted on the LED head 22 is sequentially set in the first registers R1REG1–R3REG1, G1REG1–G3REG1, and B1REG1–B3REG1 by means of the microcomputer 16.

In addition, as mentioned above, since one cycle of the encoded pulse "FG" corresponds to the time required for moving over two dots of the image in the main scanning direction, the setup of the image data from the microcomputer 16 to the first group of registers REG1 is carried out for both the durations of when the level of the encoded pulse "FG" is high and when the level of the encoded pulse "FG" is low.

On the other hand, the second group of registers REG2 is used to hold the image data "LED DATA" corresponding to each of the nine LEDs R1–R3, G1–G3, and B1–B3 in parallel, which has been sequentially set in the first group of registers REG1.

The second group of registers REG2 includes nine second registers as mentioned above. In FIG. 4, they include the second registers R1REG2, R2REG2, and R3REG2 to hold the image data "LED DATA" corresponding to three LEDs for red light R1, R2, and R3, the second registers G1REG2, G2REG2, and G3REG2 to hold the image data "LED DATA" corresponding to three LEDs for green light G1, G2, and G3, and the second registers B1REG2, B2REG2, and B3REG2 to hold the image data "LED DATA" corresponding to three LEDs for blue light B1, B2, and B3.

Figure 7:
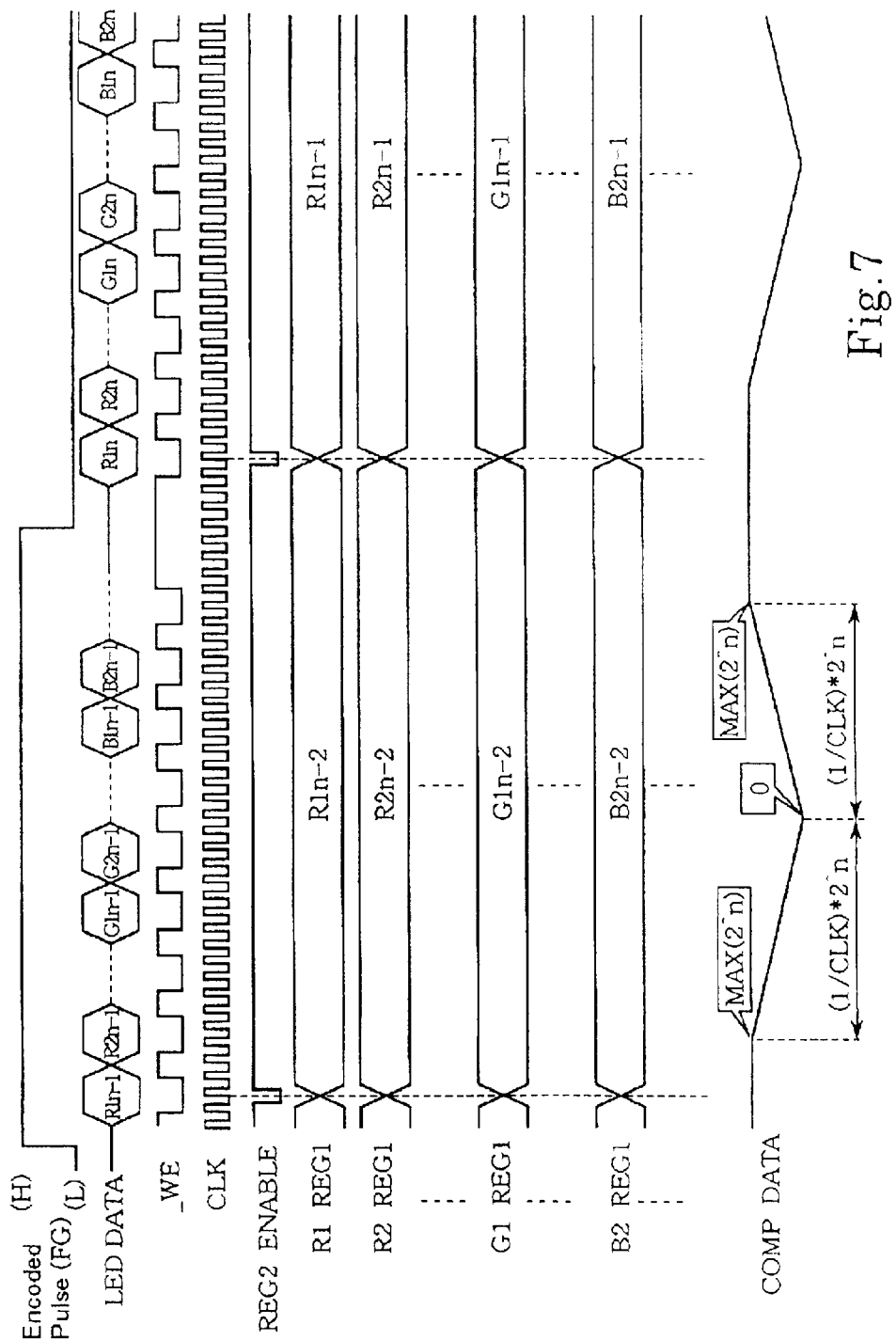
FIG. 7 is a timing chart illustrating a timing-operation for holding image data in a second group of registers in the printer shown in FIG. 1.

In the second group of registers REG2, as shown in the timing chart in FIG. 7, the image data "LED DATA" corresponding to nine LEDs R1–R3, G1–G3, and B1–B3, which was set in the first group of registers REG1, is held (shifted) in parallel by being synchronized with the encoded pulse "FG," and being synchronized with the rising edge of the clock signal "CLK" sent from the oscillator 12 while the level of the enable signal "ENA" is low.

Namely, the image data "LED DATA" corresponding to the total of nine LEDs R1–R3, G1–G3, and B1–B3, which was respectively set in the first group of registers R1REG1–R3REG1, G1REG1–G3REG1, and B1REG1–B3REG1, is held in the second group of registers R1REG2–R3REG2, G1REG2–G3REG2, and B1REG2–B3REG2 in parallel.

As mentioned above, since one cycle of the encoded pulse "FG" corresponds to a time required for moving over two dots of the image in the main scanning direction, the transfer (shift) of the image data from the first group of registers REG1 to the second group of registers REG2 is carried out for each of a duration when a level of the encoded pulse "FG" is high and when a level of the encoded pulse "FG" is low.

As can be seen from the timing charts in FIGS. 6 and 7, the setting of the image data from the microcomputer 16 in the first group of registers REG1 is carried out in parallel with holding of the image data in the second group of registers REG2, and emission of the LEDs (exposure to a printing paper).

Concretely, the image data for the $(n-2)^{th}$ exposure is held in the second group of registers REG2, and the image data for the $(n-1)^{th}$ exposure is set in the first group of registers REG1 by the microcomputer 16 while the $(n-2)^{th}$ exposure is carried out on the basis of the image data for the $(n-2)^{th}$ exposure.

After setting of the image data and exposure are completed, the image data set in the first group of registers REG1 is transferred to the second group of registers REG2, and held in the second group of registers REG2.

The $(n-1)^{th}$ exposure and the setup of the image data for the nth exposure to the first group of registers REG1 by means of the microcomputer 16 are then carried out. Subsequently, the operations mentioned above are repeated.

In this way, since the printer 10 has the second group of registers REG2, the data held in the first group of registers REG1 can be held in the second group of registers REG2 at the transition point of the encoded pulse "FG." Therefore, since the image data held in the second group of registers REG2 is used for the drive of LEDs, the microcomputer 16 can set subsequent image data in the first group of registers REG1 following detection of the transition point of the encoded pulse "FG."

Namely, since the printer 10 has a structure such that the first group of registers REG1 for setting the image data and the second group of registers REG2 for driving the LEDs are separated, the printer 10 need only set the subsequent image data while exposing one dot (during one exposure). Therefore, even if an inexpensive microcomputer with a low processing speed is used as the microcomputer 16, a plurality of image data to be set in the LED head 22 can reliably be set so long as a reasonable memory capacity is available. Thus, the printer 10 can readily provide both high speed and high resolution printing.

Next, each comparator "Compare" of the group of comparators 38 outputs to the LED driver 20 an LED control signal "LED_CTL" for controlling an LED driver 20.

In this case, a printing on/off signal "PRINT_ON/OFF" for switching between a printing state and a non-printing state is input by the microcomputer 16 to each comparator of the group of comparators 38, and the image data "LED DATA" is input by a corresponding second register in the second group of registers REG2 to each comparator of the group of comparators 38. The comparative data "COMP DATA" is also input by the LED control circuit 36 to each comparator of the group of comparators 38. Each comparator "Compare" compares the image data "LED DATA" held in the second group of registers REG2 with the comparative data "COMP DATA" input by the LED control circuit 36, and outputs an LED control signal "LED_CTL" for controlling the LED driver 20 on the basis of a comparative result and "PRINT_ON/OFF" signal received from the microcomputer 16.

Figure 5:
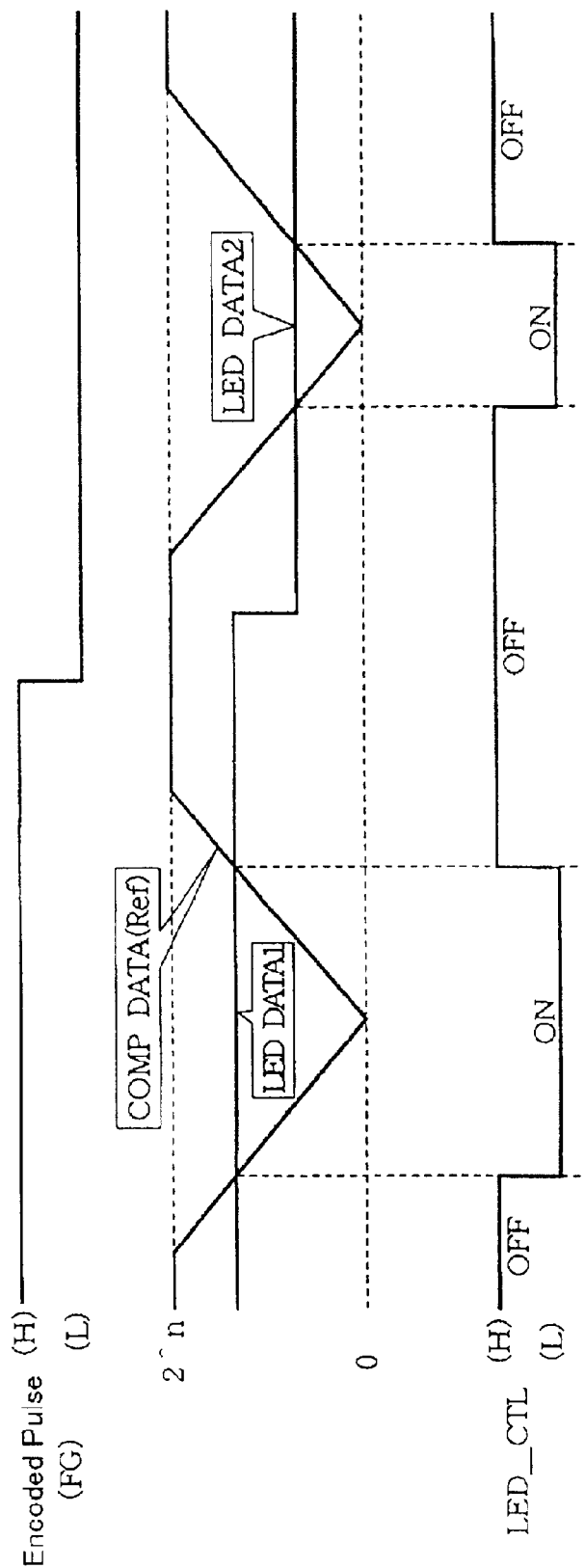
FIG. 5 is a timing chart illustrating a timing-relation between image data and an LED control signal in the printer shown in FIG. 1.

As shown in the timing chart in FIG. 5, the level of the LED control signal "LED_CTL" becomes low when the level of the image data "LED DATA" is higher than that of the comparative data "COMP DATA," and also when the level of the "PRINT_ON/OFF" signal is low, which indicates that the printer 10 is in the printing state. The LEDs emit light when the level of the LED control signal "LED CTL" is low.

In addition, the polarity of the LED control signal "LED_CTL" is not limited to either low or high. Conversely, it should be noted that the LEDs could emit lights when the level of the polarity of the LED control signal "LED_CTL" is high.

In the Cycolor type printer 10 of the present embodiment, photosensitive printing papers are placed close to and opposed to the LED head 22. The printer 10 exposes a photosensitive printing paper by moving the LED head 22 in the main scanning direction, and simultaneously emitting lights with colors corresponding to the image data to the photosensitive printing paper. When the LED head 22 arrives at one end of the printing region in the photosensitive printing paper, the photosensitive printing paper is moved by a predetermined number of dots in the sub scanning direction. Similarly, the LED head 22 is moved in the main scanning direction, and the printer 10 emits lights with colors corresponding to the image data to the photosensitive printing paper. Subsequently, the operations mentioned above are repeated.

Thus, the photosensitive printing paper is two-dimensionally exposed by means of the LED head 22, thereby the latent image being recorded on the photosensitive printing paper.

In the exposure step, the linear scale and the sensor 28 generate the encoded pulses FG1 and FG2, as the LED head 22 is moving. The LR signal is generated on the basis of the encoded pulses FG1 and FG2 in the gate IC 18. The microcomputer 16 calculates coordinate positions of the nine LEDs R1–R3, G1–G3, and B1–B3 that are provided (mounted) on the LED head 22. Then, the microcomputer 16 reads out an image data corresponding to the coordinate position of each of the LEDs R1–R3, G1–G3, and B1–B3 from the memory 14, and sets up the image data read out from the memory 14 in the first group of registers REG1 in the gate IC 18 sequentially.

In the development step, the portion in the photosensitive printing paper in which the exposure was completed is mechanically pressured by being interposed between the pressure mechanism 222 and a pressed surface (not shown), thereby developing the image data in the memory 14. Therefore, the image data is developed on the whole area of the photosensitive printing paper by moving the LED head 22 in the main scanning direction and concurrently moving the photosensitive printing paper in the sub scanning direction.

In the development step, microcapsules that are not hardened, and are to be left soft are crushed by the pressure mechanism 222 and the pressed surface, the ink in the crushed microcapsules is mixed with each other, and the photosensitive printing paper is colored in accordance with the image data, thereby reproducing the desired image on the photosensitive printing paper.

Then, the developed printing paper is heated by means of the heater 32, thereby hardening the image on the printing paper. At this point, the process of printing is completed.

Figure 8:
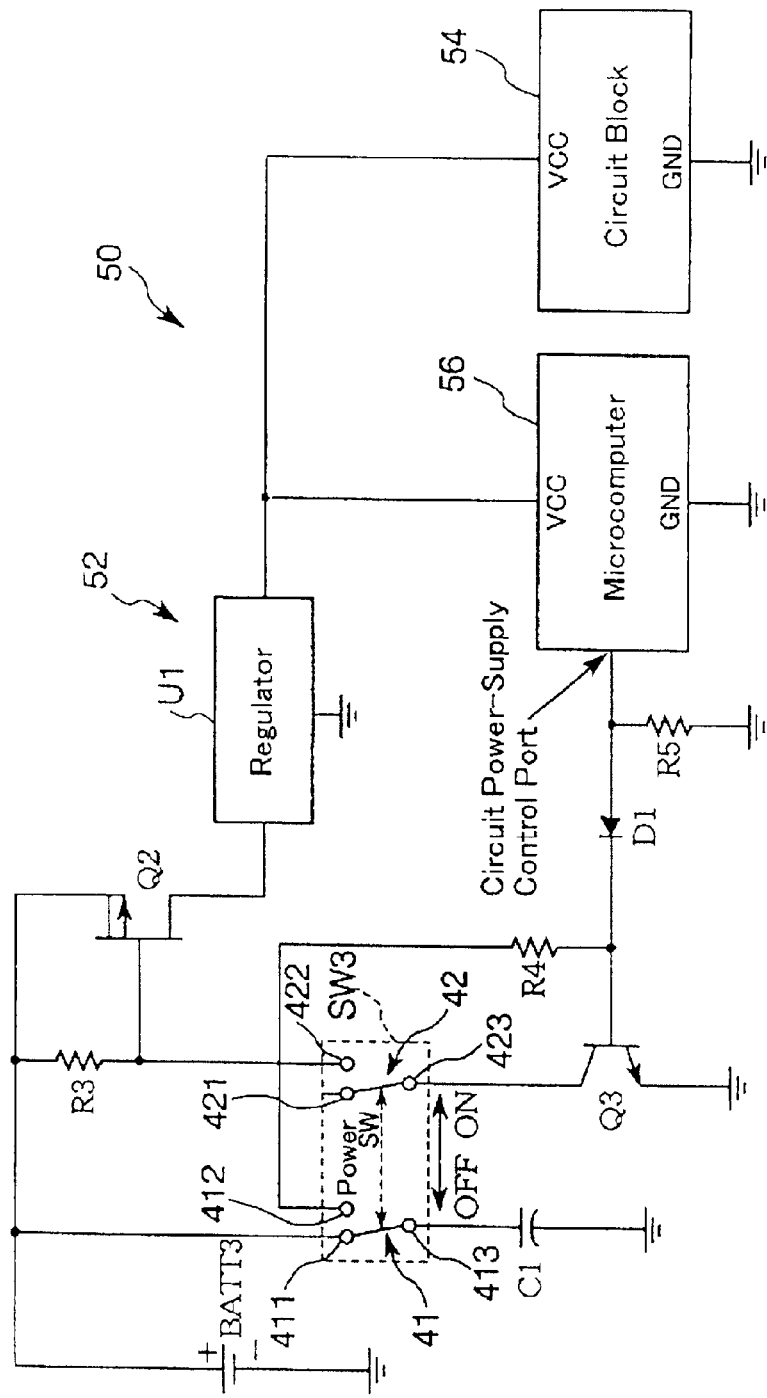
FIG. 8 is a block diagram (circuit diagram) illustrating a first embodiment of a power supply circuit (power control circuit) in the printer shown in FIG. 1.

Next, a power supply circuit of the printer 10 shown in FIG. 1 in a first embodiment will be described. FIG. 8 is a block diagram (circuit diagram) illustrating a first embodiment of the power supply circuit (power control circuit) of the printer shown in FIG. 1.

In accordance with the present invention, the printer (electronic device) 50, as shown in FIG. 8, has a power supply circuit that utilizes a power control circuit 52. In addition, internal circuits of the printer 50 other than the power control circuit 52 are notionally shown as a circuit block 54 to simplify the following explanation.

In the printer shown in FIG. 8, the power control circuit 52 comprises a battery (power section) BATT3; a power on/off switch SW3; a capacitive element (condenser) C1; a first transistor (first switching element) Q3; a second transistor (second switching element) Q2; a regulator U1; and a microcomputer (central processing unit) 56.

The transistor includes at least a bipolar transistor and a field-effect transistor.

The battery BATT3 is a source of direct-current power supply, such as a primary battery and a secondary battery. One terminal of the battery BATT3 is connected to ground, as shown in FIG. 8.

It is to be noted, however, that in the present invention the power section (power supply means) is not limited to the use of batteries, and may comprise a power supply circuit having an AC/DC converter or a DC/DC converter, which converts alternating current (A.C.) voltage supplied from an outlet (power point) to stable direct current (D.C.) voltage.

The power on/off switch SW3 has a first switch 41 and a second switch 42, which are concurrently turned either on or off relative to one another. In the present embodiment, single-pole double-throw (SPDT) type switches are used for the first and second switches 41 and 42. The junctions of the first switch, i.e., an upper left junction, an upper right junction and a bottom junction, as shown in FIG. 8, are hereinafter referred to as a first junction 411, a second junction 412 and a common junction 413, respectively. Similarly, an upper left junction, an upper right junction and a bottom junction of the second switch 42 are hereinafter referred to as a first junction 421, a second junction 422 and a common junction 423, respectively. The first junction 411 of the first switch 41 is connected to a positive terminal (cathode) of the battery BATT3, and the first junction 421 of the second switch 42 is opened. Thus, if it works with the first switch 41, a single-pole single-throw (SPST) type switch may be used for the second switch 42.

When the first junction 411 of the first switch 41 is connected to the common junction 413 of the first switch 41, and the first junction 421 of the second switch 42 is connected to the common junction 423 of the second switch 42, the power on/off switch SW3 is turned off, i.e., the power of the printer 50 is turned off. On the other hand, the second junction 412 of the first switch 41 is connected to the common junction 413 of the first switch 41, and the second junction of the second switch 42 is connected to the common junction 423 of the second switch 42, the power on/off switch SW3 is turned on, i.e., the power of the printer 50 is turned on.

The capacitive element C1 is provided between the common junction 413 of the first switch 41 and ground to be charged while the power on/off switch SW3 is turned off. Namely, the capacitive terminal C1 is connected to the battery BATT3 via the first switch 41. The electric charge of the capacitive element C1 is used for turning the first transistor Q3 on when the power on/off switch SW3 is turned on.

The first transistor Q3 shown in FIG. 8 is a NPN bipolar transistor. A collector terminal of the first transistor Q3 is connected to the battery BATT3 via the first switch 41. A base terminal of the first transistor Q3 is connected to a cathode terminal of the diode D1, and to the second junction 412 of the second switch 42 via a resistive element R4.

The second transistor Q2 shown in FIG. 8 is a p-type MOSFET (Metal-Oxide Semiconductor Field-Effect Transistor). A source terminal of the second transistor Q2 is connected to the positive terminal of the battery BATT3. A gate terminal of the second transistor Q2 is connected to the second junction 422 of the second switch 42, and to the positive terminal of the battery BATT3 via a resistive element R3.

The switching functions of the first transistor Q3 and the second transistor Q2 are not limited to that described in the present embodiment, and a variety of switching elements, such as various types of transistors that are known in the prior art, can be utilized.

The regulator Ut stabilizes a power-supply voltage supplied from the battery BATT3 via the second transistor Q2 at a predetermined voltage value. An input terminal of the regulator U1 is connected to a drain terminal of the second transistor Q2, and its ground terminal is connected to ground. Further, an output terminal of the regulator U1 is connected to a power-supply terminal VCC of the microcomputer 56 and a power-supply terminal VCC of the circuit block 54. The electric power output from the regulator U1 is supplied to each of the microcomputer 56 and the circuit block 54. It is to be noted that the regulator U1 may be omitted.

The microcomputer 56 is used to achieve an automatic power-off function, by controlling application of power (power on/off) to the first transistor Q3. As mentioned above, the power-supply terminal VCC of the microcomputer 56 is connected to the output terminal of the regulator U1, and its ground terminal GND is connected to ground. Further, a circuit power-supply control port of the microcomputer 56 is connected to an anode terminal of the diode D1, and to ground via a resistive element R5.

In the present embodiment, the microcomputer 56 is programmed so as to set the circuit power-supply control port to high level (H) just after application of power and to set the circuit power-supply control port to low level (L) if the microcomputer 56 detects a state that the circuit block 54 has not carried out any operation within a given period of time.

Here, the microcomputer 56 may be provided for the power control circuit 52 exclusively, but it is preferable that the microcomputer 56 is used also in place of the microcomputer 16 as shown in FIG. 1, thereby eliminating the use of one microcomputer and reducing the cost of the printer 50.

On the other hand, as mentioned above, the circuit block 54 notionally shows internal circuits other than the power control circuit 52 of the printer 50. The power-supply terminal VCC of the circuit block 54 is connected to the output terminal of the regulator U1, and its ground terminal GND is connected to ground.

Next, operations of the power control circuit 52 according to the first embodiment of the present invention will be described.

While the power on/off switch SW3 is turned off, i.e., if the first junctions 411 and 421 are connected to the common junctions 413 and 423 respectively, the capacitive element C1 is charged by the battery BATT3 because the capacitive element C1 is connected to the battery BATT3.

At this time, the gate terminal of the second transistor Q2 is held at a high level via the resistive element R3. For this reason, the second transistor Q2 is turned off, thereby cutting off supply of power to the regulator U1, resulting in the power not being supplied to the circuit block 54 and the microcomputer 56. Namely, the printer 50 is at a power-off state, and the circuit block 54 and the microcomputer 56 are in a rest state.

Further, the circuit power-supply control port is held at a low level via the resistive element R5. Thus, the base terminal of the first transistor Q3 is also held at a low level via the diode D1. Namely, flow of the base current stops, and the first transistor Q3 is turned off.

On the other hand, when the power on/off switch SW3 is changed from a power-off state to a power-on state, the second junctions 412 and 422 are connected to the common junctions 413 and 423 respectively, and the capacitive element C1 gets connected to the base terminal of the first transistor Q3 via the resistive element R4. Thus, when the level of the base terminal of the first transistor Q3 becomes high and the base current start to flow, the first transistor Q3 is turned on.

When the first transistor Q3 is turned on, the level of the gate terminal of the second transistor Q2 becomes low via the second switch 42 and the first transistor Q3, and as a result, the second transistor Q2 is also turned on. Therefore, the power is supplied from the battery BATT3 to the regulator U1 via the second transistor Q2, so a stable power supply to the circuit block 54 and the microcomputer 56 can be maintained. Namely, as the printer 50 is turned on, operable states of each of the circuit block 54 and the microcomputer 56 are changed.

Moreover, as mentioned above, the circuit power-supply control port is set to a high level, by means of programs provided in the microcomputer 56, immediately after application of power. Thus, since a level of the base terminal of the first transistor Q3 becomes high through the diode D1, the first transistor Q3 is controlled so as to hold the power-on state.

In other words, in the power control circuit 52 of the present invention, the first transistor Q3 is turned on by the electric charge of the capacitive element C1, thereby turning on the second transistor Q2. As a result, the printer 50 is switched to a power-on state. Therefore, it is necessary that the microcomputer 56 is programmed so that the first transistor Q3 is held at the power-on state by setting the circuit power-supply control port to a high level before the electric charge of the capacitive element C1 is discharged and then the first transistor Q3 is turned off.

In addition, a time until an electric charge of the capacitive element C1 is discharged may be determined by appropriately changing, for example, a capacitance value of the capacitive element C1, or a resistance value of the resistive element R4, in response to a required period of time until the circuit power-supply control port is set to a high level after the power is supplied to the microcomputer 56.

If the circuit block 54 remains in a state where no operation is carried out within a given length of time, which is pre-set by the program of the microcomputer 56, during the power-on state, then the microcomputer 56 sets the circuit power-supply control port to a low level by default. Thus, since the level of the base terminal of the first transistor Q3 also becomes low via the diode D1, the first transistor Q3 is controlled to be turned off.

When the first transistor Q3 is turned off, the second transistor Q2 is also turned off because the level of the gate terminal of the second transistor Q2 becomes high via the resistive element R3 by means of the battery BATT3. Therefore, no power is supplied to the regulator U1, and supply of power to the circuit block 54 and the microcomputer 56 is stopped. Namely, the printer 50 becomes an automatic power-off state, and both the circuit block 54 and the microcomputer 56 become a rest state automatically.

If the power supply of the printer 50 must be turned on again after the automatic power-off operation was carried out, the power on/off switch SW3 is first turned off, and then the power on/off switch SW3 is turned on after the capacitive element C1 has been charged substantially. Hereinafter, the operations mentioned above are carried out.

As explained above, according to the power control circuit 52 of the present invention, since a supply of power to not only the circuit block 54 but also the power control circuit 52 including the microcomputer 56 is completely stopped when the power supply of the printer 50 is turned off, electrical power consumption can be reduced, thereby extending the battery life of the battery BATT3.

Further, it is not necessary for the microcomputer 56 to monitor the state of the power on/off switch SW3, and one port of the microcomputer 56 for monitoring can be reduced. Also, since it is sufficient for the program of the microcomputer 56 to include at least a part for controlling the on or off position of the power supply, the program can be simplified. Moreover, since it is not required for the printer 50 to be changed to a sleep mode, the incidence of bug infection can be decreased.

In addition, the printer in the present embodiment mentioned above is a Cycolor type, but the present invention is not limited to the Cycolor printer. Also, the printer used in the present invention is not limited to the printers that reproduce (print out) an image on a photosensitive printing paper by exposing the photosensitive printing paper.

Further, the printer used in the present invention may be one that can reproduce images with a plurality of colors such as a full-color printer, or one that reproduces black-and-white (monochrome) images.

In the first embodiment the present invention has been explained by using a printer as an electronic device, but the present invention is not limited thereto. The power control circuit of the present invention is applicable to every electronic device provided with a power supply circuit such as a notebook type personal computer (laptop), a personal data assistant (PDA) machine, a handy type game machine, and a battery-operated radio and audio equipment, as well as a printer.

Figure 9:
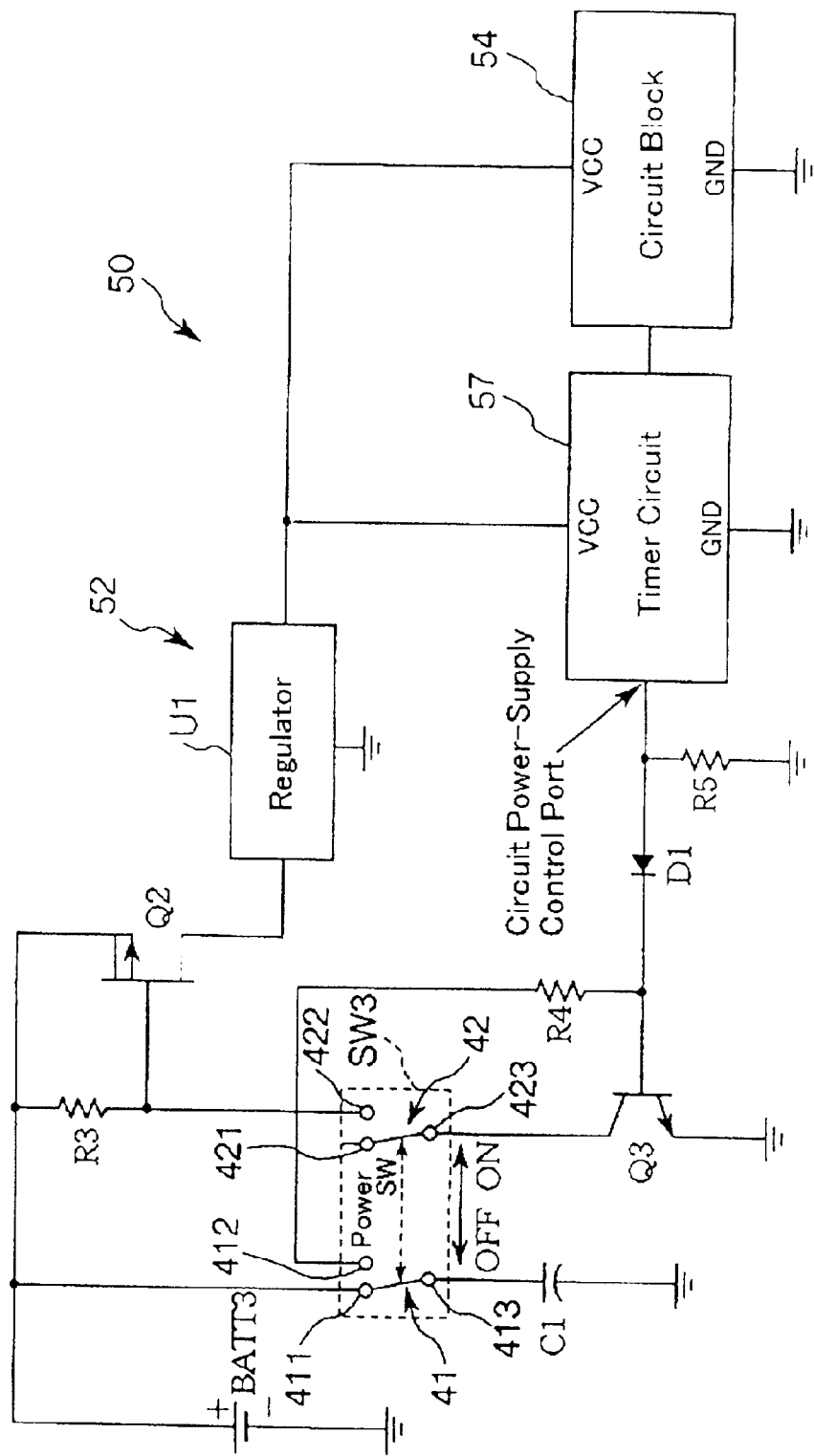
FIG. 9 is a block diagram (circuit diagram) illustrating a second embodiment of a power circuit (power control circuit) in the printer shown in FIG. 1.

Next, a power supply circuit of the printer 10 shown in FIG. 1 in a second embodiment will be described. FIG. 9 is a block diagram (circuit diagram) illustrating a second embodiment of a power circuit (power control circuit) in the printer shown in FIG. 1.

In the printer shown in FIG. 9, the power control circuit 52 comprises a battery (power section) BATT3; a power on/off switch SW3; a capacitive element (condenser) C1; a first transistor (first switching element) Q3; a second transistor (second switching element) Q2; a regulator U1; and a timer circuit (hard circuit) 57. As can be seen in FIG. 9, the power control circuit 52 of the second embodiment has a timer circuit 57 instead of the microcomputer 56. Here, like reference numerals refer to like elements (components and parts) in FIGS. 8 and 9. To avoid repeated description, the explanation is omitted.

The timer circuit 57 is used for achieving a function of automatic power-off by controlling application of power (power on/off) to the first transistor Q3. A power-supply terminal VCC of the timer circuit 57 is connected to the output terminal of the regulator U1, and its ground terminal GND is connected to ground. Further, an input terminal of the timer circuit 57 is connected to an output terminal of the circuit block 54, and an output terminal (circuit power-supply control port) of the timer circuit 57 is connected to an anode terminal of the diode D1, and to ground via a resistive element R5. Therefore, the output signal from the circuit block 54 is input to the input terminal of the timer circuit 57, and the output signal of the timer circuit 57 is output to the diode D1.

In the present embodiment, the timer circuit 57 is designed so that the level of the output signal becomes high (H) just after application of power, and that the level of the output signal is changed to low (L) if it is detected that the circuit block 54 has carried out no operations for a given length of time by measuring the given length of time on the basis of the output signal from the circuit block 54.

Figure 10:
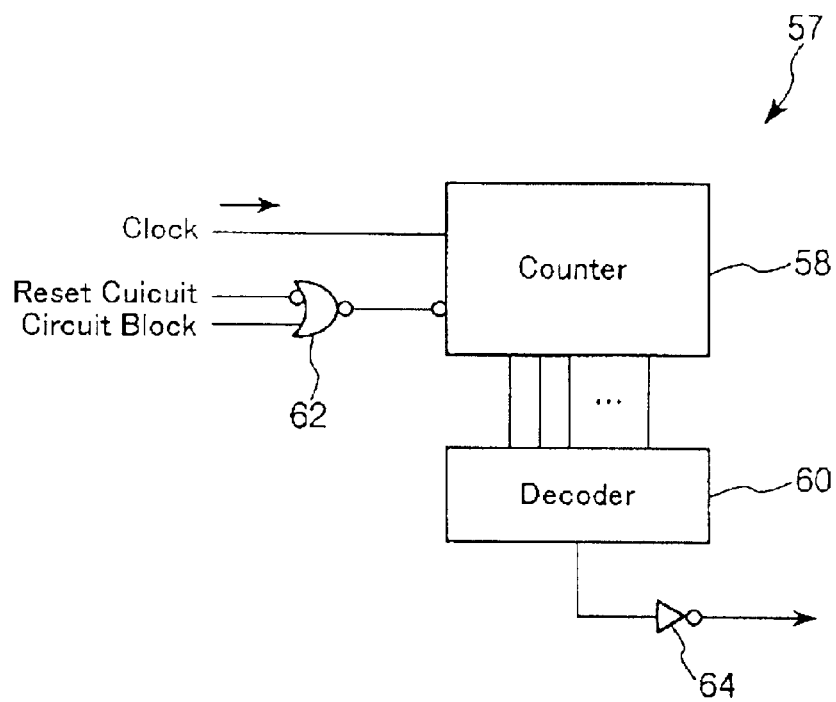
FIG. 10 is a block diagram (circuit diagram) illustrating one example of a structure of a timer circuit used in the power control circuit shown in FIG. 9.
Figure 11:
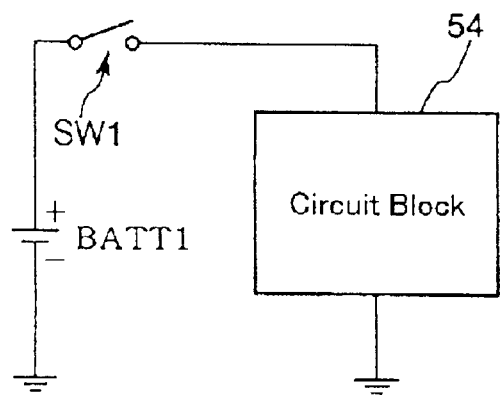
FIG. 11 is a block diagram (circuit diagram) illustrating a power circuit of a conventional electronic device.
Figure 12:
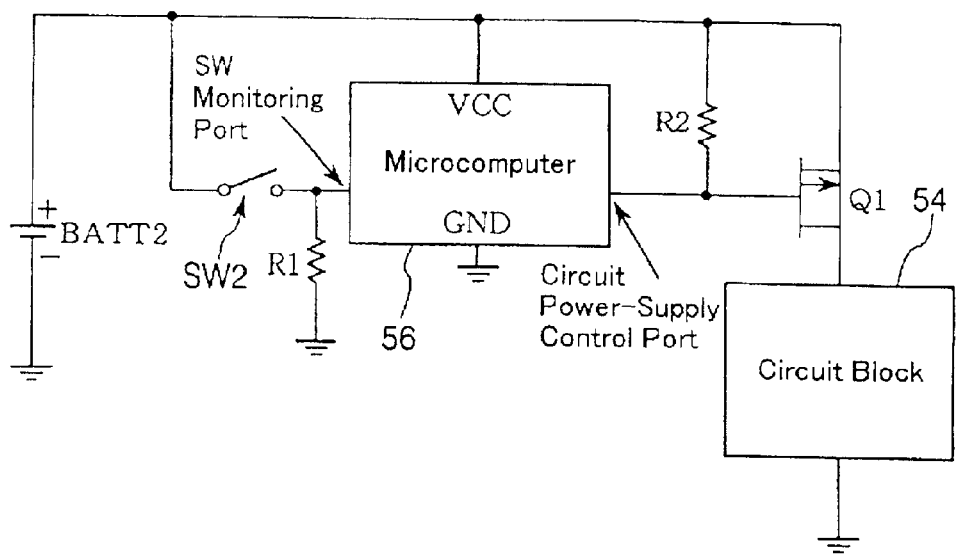
FIG. 12 is a block diagram (circuit diagram) illustrating a power circuit of an electronic device using a conventional power control circuit.

Next, an example of a structure of the timer circuit 57 will be described. FIG. 10 is a block diagram (circuit diagram) illustrating an example of the structure of a timer circuit used in the power control circuit shown in FIG. 9.

The timer circuit 57 shown in FIG. 10 comprises a counter 58 for counting clock signals; a decoder 60 for decoding the output signal of the counter 58; a NOR gate 62; and an inverter 64.

The clock signal is input to a clock terminal of the counter 58, and an output of the NOR gate 62 is input to a reset inverting input terminal. An output signal of a reset circuit (not shown), which resets an overall system of the printer 50 at the application of power of the printer 50, is input to an inverting input terminal of the NOR gate 62.

Further, output signals of the counter 58 are input to the decoder 60, and an output signal of the decoder 60 is inverted by means of the inverter 64 and is output from the timer circuit 57 as an output signal of the timer circuit 57.

In the timer circuit 57 shown in FIG. 10, the level of the output signal of the reset circuit becomes low within a constant period of time at the application of power. As a result, the level of the output signal of the NOR gate 62 becomes low, thereby initializing the output signals of the counter 58. For example, all output signals then become zero.

The decoder 60 is set so as to output a high-level signal when the output signal of the counter 58 becomes a predetermined value. In this case, the decoder 60 outputs a low-level signal if all of the output signals of the counter 58 are zero. Therefore, the level of the output signal of the timer circuit 57 becomes high immediately after the application of power by inverting and outputting the output signal of the decoder 60 (i.e., low level) by means of the inverter 64.

Here, in the present embodiment (second embodiment), the level of the output signal of the circuit block 54 is predefined so as to become high when the circuit block 54 carries out any operation and low when the circuit block 54 carries out no operation.

Therefore, the level of the output signal of the NOR gate 62 becomes low when the output signal of the circuit block 54 is high, i.e., while the circuit block 54 is carrying out any operation. As a result, all the output signals of the counter 58 become zero, and the output signal of the timer circuit 57 is held at a high level.

On the other hand, the level of the output signal of the NOR gate 62 becomes high when the level of the output signal of the circuit block 54 is low, i.e., during the period when the circuit block 54 is not carrying out any operation. As a result, the counter 58 counts the clock signals up from zero sequentially.

When the counting value that the counter 58 obtains by counting clock signals becomes a predetermined value (a predetermined time is measured), the level of the output signal of the decoder 60 becomes high, and the level of the output signal of the timer circuit 57 becomes low. Arriving at a certain predetermined value would mean that the circuit block 54 has not carried out any operation for a certain predetermined time.

In addition, the circuit structure of the timer circuit 57 is not limited to that mentioned above. For example, a variety of timer circuits that are known in the prior art, are available as long as they measure a predetermined time on the basis of the output signal of the circuit block 54.

Further, as mentioned above, the circuit block 54 notionally shows internal circuits of the printer 50 other than the power control circuit 52. The power-supply terminal VCC of the circuit block 54 is connected to the output terminal of the regulator U1, its ground terminal GND is connected to ground, and its output terminal is connected to the timer circuit 57.

Next, operations of the power control circuit 52 according to the second embodiment of the present invention will be described.

While the power on/off switch SW3 is turned off, i.e., if the first junctions 411 and 421 are connected to the common junctions 413 and 423 respectively, the capacitive element C1 is charged by the battery BATT3 because the capacitive element C1 is connected to the battery BATT3.

At this time, the gate terminal of the second transistor Q2 is held at a high level via the resistive element R3. For this reason, the second transistor Q2 is turned off. Therefore, the power is not supplied to the regulator U1, and also not supplied to the circuit block 54 and the timer circuit 57. Namely, the printer 50 is at a power-off state, and the circuit block 54 and the timer circuit 57 are in a rest state.

Further, the output signal of the timer circuit 57 (circuit power-supply control port) is held at a low level via the resistive element R5. Thus, the base terminal of the first transistor Q3 is also held at a low level via the diode D1. Namely, because a base current is not flowing, the first transistor Q3 is turned off.

On the other hand, when the power on/off switch SW3 is changed from a power-off state to a power-on state, the second junctions 412 and 422 are connected to the common junctions 413 and 423 respectively, and the capacitive element C1 is connected to the base terminal of the first transistor Q3 via the resistive element R4. Thus, since the level of the base terminal of the first transistor Q3 becomes high and the base current starts to flow, the first transistor Q3 is turned on.

As the level of the gate terminal of the second transistor Q2 becomes low via the second switch 42 and the first transistor Q3 when the first transistor Q3 is turned on, the second transistor Q2 is also turned on. Therefore, the power is supplied from the battery BATT3 to the regulator U1 via the second transistor Q2, so a stable power supply to the circuit block 54 and the timer circuit 57 is maintained. Namely, since the printer 50 is turned on, both the circuit block 54 and the timer circuit 57 change to an operable state.

Moreover, as mentioned above, the level of the output signal of the timer circuit 57 is set to high by means of programs of the microcomputer 56 immediately after application of power. Thus, since the level of the base terminal of the first transistor Q3 becomes high via the diode D1, the first transistor Q3 is controlled so as to hold the power-on state.

In other words, in the power control circuit 52 of the present invention, the first transistor Q3 is turned on by the electric charge of the capacitive element C1, thereby the second transistor Q2 being then turned on. As a result, the printer 50 is changed to the power-on state. Therefore, it is necessary that the level of the output signal of the timer circuit 57 becomes high immediately after application of power so that the first transistor Q3 is held at the power-on state before the electric charge of the capacitive element C1 is discharged and then the first transistor Q3 is turned off.

In addition, a time until the electric charge of the capacitive element C1 is discharged may be determined by appropriately changing, for example, the capacitance value of the capacitive element C1 or the resistance value of the resistive element R4, in response to the time required to set the level of the output signal of the timer circuit 57 to high after the power is supplied to the timer circuit 57.

If the circuit block 54 carries out no operation for a predetermined length of time during the power-on state, the level of the output signal of the timer circuit 57 is changed to low after the timer circuit 57 measures the predetermined period of time on the basis of the output signal of the circuit block 54, as mentioned above. Thus, since the level of the base terminal of the first transistor Q3 also becomes low via the diode D1, the first transistor Q3 is controlled to be turned off.

When the first transistor Q3 is turned off, the second transistor Q2 is also turned off because the level of the gate terminal of the second transistor Q2 becomes high via the resistive element R3 by means of the battery BATT3. Therefore, no power is supplied to the regulator U1, and the supply of power to the circuit block 54 and the timer circuit 57 is stopped. Namely, the printer 50 comes to an automatic power-off state, and both the circuit block 54 and the timer circuit 57 become a rest state automatically.

If the power supply of the printer 50 should be turned on again after the automatic power-off operation was carried out, the power on/off switch SW3 is first turned off, and then the power on/off switch SW3 is turned on after the capacitive element C1 has been charged substantially. Hereinafter, the operations mentioned above will be carried out.

As explained above, according to the power control circuit 52 of the present invention, since a supply of power to not only the circuit block 54 but also the power control circuit 52 including the timer circuit 57 is completely stopped when the power supply of the printer 50 is turned off, electrical power consumption can be reduced, thereby improving the battery life of the battery BATT3.

Further, since it is not necessary to use a microcomputer, the structure of the printer 50 can be simplified. Moreover, the problems accompanying the programming of a microcomputer such as the occurrence of a bug can also be eliminated, if a microcomputer is not used, thereby reducing the cost of the printer 50.

In the second embodiment, the present invention has been explained by using a timer circuit as a hard circuit, but the hard circuit in the present invention is not limited thereto. The hard circuit in the present invention must not be driven with a program contrary to a microcomputer.

What is claimed is:

1. A power control circuit for controlling on/off of power of an electronic device including a power section and a predetermined circuit block, the power control circuit comprising:

a power on/off switch having a first switch and a second switch, the first and second switches adapted to be turned on or off simultaneously;

a capacitive element connected to the power section via the first switch, said capacitive element adapted to be charged by the power section via the first switch when said power on/off switch is turned off and to be discharged when said power on/off switch is turned on;

a first switching element connected to the power section via the second switch, said first switching element adapted to be turned off when said power on/off switch is turned off, and to be in a power-on state while an electric charge that has been charged in said capacitive element is being discharged when said power on/off switch is turned on;

a microcomputer for controlling power on/off of said first switching element; and a second switching element provided between the power section and each of said microcomputer and the predetermined circuit block, said second switching element adapted to be turned off to stop power supply to said microcomputer and the predetermined circuit block when said first switching element is turned off, and to be turned on to supply power to said microcomputer and the predetermined circuit block when said first switching element is turned on;

wherein said microcomputer is programmed to control the power control circuit such that, when supplying power to said microcomputer, said microcomputer holds the power-on state of said first switching element before said first switching element is turned off because of the discharge of the electric charge charged in said capacitive element, and then, when said microcomputer detects that the predetermined circuit block has not operated for a given period of time, said microcomputer turns off said first switching element.

2. The power control circuit according to claim 1, wherein said power section includes one or more battery.

3. The power control circuit according to claim 1, wherein said first and second switching elements are transistors.

4. The power control circuit according to claim 1, further comprising a regulator provided between said second switching element and the predetermined circuit block for stabilizing a power-supply voltage supplied from the power section.

5. The power control circuit according to claim 1, wherein the electronic device is selected from a printer, a notebook type personal computer, a personal data assistant machine, a handy type game machine, and a battery-operated radio and audio equipment.

6. The power control circuit according to claim 1, wherein the electronic device is a printer.

7. The power control circuit according to claim 6, wherein the printer is a Cycolor type printer.

8. The power control circuit according to claim 6, wherein the printer comprises a head for exposure on which one or more light sources for emitting red light, one or more light sources for emitting green light, and one or more light sources for emitting blue light are provided; and wherein said printer is constructed to reproduce an image on a photosensitive printing paper by exposing the photosensitive printing paper by means of said head for exposure.

9. The power control circuit according to claim 8, wherein the printer further comprises:

a first group of registers for setting image data corresponding to the light sources for emitting red light, image data corresponding to the light sources for emitting green light, and image data corresponding to the light sources for emitting blue light; and a second group of registers for holding the image data, which has been set in each of said first group of registers;

wherein said printer is constructed so as to set next image data in said first group of registers and to drive each of the light sources provided on the head for exposure by using the image data that is held in each of said second group of registers in parallel.

10. The power control circuit according to claim 8, wherein the photosensitive printing paper contains a plurality of photosensitive microcapsules to be exposed by said head for exposure.

11. A power control circuit for controlling on/off of power of an electronic device including a power section and a predetermined circuit block, the power control circuit comprising:

a power on/off switch having a first switch and a second switch, the first and second switches adapted to be turned on or off simultaneously;

a capacitive element connected to the power section via the first switch, said capacitive element adapted to be charged by the power section via the first switch when said power on/off switch is turned off and to be discharged when said power on/off switch is turned on;

a first switching element connected to the power section via the second switch, said first switching element adapted to be turned off when said power on/off switch is turned off, and to be in a power-on state while an electric charge that has been charged in said capacitive element is being discharged when said power on/off switch is turned on;

a hard circuit for controlling power on/off of said first switching element; and a second switching element provided between the power section and each of said hard circuit and the predetermined circuit block, said second switching element adapted to be turned off to stop power supply to said hard circuit and the predetermined circuit block when said first switching element is turned off, and to be turned on to supply power to said hard circuit and the predetermined circuit block when said first switching element is turned on;

wherein the power control circuit is constructed such that, when supplying power to said hard circuit, said hard circuit holds the power-on state of said first switching element before said first switching element is turned off because of the discharge of the electric charge charged in said capacitive element, and then, when said hard circuit detects that the predetermined circuit block has not operated for a given period of time by measuring the given period of time based on an output signal of the predetermined circuit block, said hard circuit turns off said first switching element.

12. The power control circuit according to claim 11, wherein said hard circuit is a timer circuit.

13. The power control circuit according to claim 11, wherein said power section includes one or more battery.

14. The power control circuit according to claim 11, wherein said first and second switching elements are transistors.

15. The power control circuit according to claim 11, further comprising a regulator provided between said second switching element and the predetermined circuit block for stabilizing a power-supply voltage supplied from the power section.

16. The power control circuit according to claim 11, wherein the electronic device is selected from a printer, a notebook type personal computer, a personal data assistant machine, a handy type game machine, and a battery-operated radio and audio equipment.

17. The power control circuit according to claim 11, wherein the electronic device is a printer.

18. The power control circuit according to claim 17, wherein the printer is a Cycolor type printer.

19. The power control circuit according to claim 17, wherein the printer comprises a head for exposure on which one or more light sources for emitting red light, one or more light sources for emitting green light, and one or more light sources for emitting blue light are provided; and wherein said printer is constructed to reproduce an image on a photosensitive printing paper by exposing the photosensitive printing paper by means of said head for exposure.

20. The power control circuit according to claim 17, wherein the printer further comprises:

a first group of registers for setting image data corresponding to the light sources for emitting red light, image data corresponding to the light sources for emitting green light, and image data corresponding to the light sources for emitting blue light; and a second group of registers for holding the image data, which has been set in each of said first group of registers;

wherein said printer is constructed so as to set next image data in said first group of registers and to drive each of the light sources provided on the head for exposure by using the image data that is held in each of said second group of registers in parallel.

21. The power control circuit according to claim 17, wherein the photosensitive printing paper contains a plurality of photosensitive microcapsules to be exposed by said head for exposure.

22. A power control circuit for controlling on/off of power of an electronic device including a power section and a predetermined circuit block driven by power from the power section, the power control circuit comprising:

a power on/off switch for turning on and off the power section;

a capacitive element connected to said power on/off switch so that it is charged by the power section when said power on/off switch is turned off and discharged when said power on/off switch is turned on;

a first switching element adapted to be turned on by an electric charge charged in said capacitive element when the power on/off switch is turned on and to be in a power-on state while the electric charge that has been charged in said capacitive element is being discharged when said power on/off switch is turned on;

a second switching element provided between the power section and the predetermined circuit block for supplying electrical power from the power section to the predetermined circuit block, said second switching element adapted to be turned on and off in response to on and off of the first switching element; and means for holding the power-on state of said first switching element before said first switching element is turned off due to the discharge of the electric charge charged in the capacitive element, said holding means adapted to receive power from the power section when said second switching element is turned on by said first switching element, wherein said holding means is adapted to turn off said first switchina element when it is detected that the predetermined circuit block is not being operated within a predetermined period of time.

23. The power control circuit according to claim 22, wherein said power on/off switch includes a first switch connected to the capacitive element for turning on said first switching element and a second switch provided between said first switching element and said second switching element, said first and second switches adapted to be turned on and off simultaneously.

\* \* \* \* \*